United States Patent
Naletov et al.

(10) Patent No.: US 9,906,785 B2
(45) Date of Patent: Feb. 27, 2018

(54) SYSTEMS, METHODS, AND MEDIA FOR TRANSCODING VIDEO DATA ACCORDING TO ENCODING PARAMETERS INDICATED BY RECEIVED METADATA

(71) Applicant: Sonic IP, Inc., San Diego, CA (US)

(72) Inventors: Ivan Vladimirovich Naletov, Tomsk (RU); Sergey Zurpal, Seversk (RU)

(73) Assignee: Sonic IP, Inc., San Diego, CA (US)

( * ) Notice: Subject to any disclaimer, the term of this patent is extended or adjusted under 35 U.S.C. 154(b) by 225 days.

(21) Appl. No.: 13/841,943

(22) Filed: Mar. 15, 2013

(65) Prior Publication Data

US 2014/0269927 A1    Sep. 18, 2014

(51) Int. Cl.
| | |
|---|---|
| *H04N 11/02* | (2006.01) |
| *H04N 19/40* | (2014.01) |
| *H04N 19/139* | (2014.01) |
| *H04N 19/12* | (2014.01) |
| *H04N 19/14* | (2014.01) |
| *H04N 19/157* | (2014.01) |
| *H04N 19/177* | (2014.01) |

(52) U.S. Cl.
CPC ....... *H04N 19/00472* (2013.01); *H04N 19/12* (2014.11); *H04N 19/139* (2014.11); *H04N 19/14* (2014.11); *H04N 19/157* (2014.11); *H04N 19/177* (2014.11); *H04N 19/40* (2014.11)

(58) Field of Classification Search
CPC .................................. H04N 19/00472
USPC ...................... 375/240.01–240.29
See application file for complete search history.

(56) References Cited

U.S. PATENT DOCUMENTS

| | | | |
|---|---|---|---|
| 5,361,332 | A | 11/1994 | Yoshida et al. |
| 5,404,436 | A | 4/1995 | Hamilton |

(Continued)

FOREIGN PATENT DOCUMENTS

| | | |
|---|---|---|
| CN | 1169229 | 12/1997 |
| EP | 813167 A2 | 12/1997 |

(Continued)

OTHER PUBLICATIONS

"Using HTTP Live Streaming", iOS Developer Library, Retrieved from: http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, 10 pgs. (2014).

(Continued)

*Primary Examiner* — Leron Beck
(74) *Attorney, Agent, or Firm* — KPPB LLP (57) ABSTRACT

Methods, systems, and computer readable media for transcoding video data based on metadata are provided. Methods for transcoding video data using meta data are provided that include receiving portions of encoded video encoded according to varying encoding schemes. The portions of encoded video can be re-encoded according to different encoding schemes. Different encoding schemes can be selected according to received metadata. The received metadata can indicate transcoding parameters for use in re-encoding portions of encoded vide. The portions of encoded video can be received from media content sources and the metadata can be received from a media metadata source. In various embodiments, the methods can be performed by a transcoding device and/or implemented via a computer readable media and at least one processing unit.

19 Claims, 5 Drawing Sheets

(56) References Cited

U.S. PATENT DOCUMENTS

| | | |
|---|---|---|
| 5,479,303 A | 12/1995 | Suzuki et al. |
| 5,502,766 A | 3/1996 | Boebert et al. |
| 5,509,070 A | 4/1996 | Schull |
| 5,589,993 A | 12/1996 | Naimpally et al. |
| 5,715,403 A | 2/1998 | Stefik |
| 5,717,816 A | 2/1998 | Boyce et al. |
| 5,754,648 A | 5/1998 | Ryan et al. |
| 5,805,700 A | 9/1998 | Nardone et al. |
| 5,841,432 A | 11/1998 | Carmel et al. |
| 5,867,625 A | 2/1999 | McLaren |
| 5,887,110 A | 3/1999 | Sakamoto et al. |
| 5,892,900 A | 4/1999 | Ginter et al. |
| 5,946,446 A | 8/1999 | Yanagihara |
| 5,999,812 A | 12/1999 | Himsworth |
| 6,018,611 A | 1/2000 | Nogami et al. |
| 6,031,622 A | 2/2000 | Ristow et al. |
| 6,038,257 A | 3/2000 | Brusewitz et al. |
| 6,044,469 A | 3/2000 | Horstmann |
| 6,047,100 A | 4/2000 | McLaren |
| 6,058,240 A | 5/2000 | McLaren |
| 6,064,794 A | 5/2000 | McLaren et al. |
| 6,097,877 A | 8/2000 | Katayama et al. |
| 6,141,754 A | 10/2000 | Choy |
| 6,155,840 A | 12/2000 | Sallette |
| 6,175,921 B1 | 1/2001 | Rosen |
| 6,195,388 B1 | 2/2001 | Choi et al. |
| 6,222,981 B1 | 4/2001 | Rijckaert |
| 6,282,653 B1 | 8/2001 | Berstis et al. |
| 6,289,450 B1 | 9/2001 | Pensak et al. |
| 6,292,621 B1 | 9/2001 | Tanaka et al. |
| 6,389,218 B2 | 5/2002 | Gordon et al. |
| 6,389,473 B1 | 5/2002 | Carmel et al. |
| 6,397,230 B1 | 5/2002 | Carmel et al. |
| 6,418,270 B1 | 7/2002 | Steenhof et al. |
| 6,449,719 B1 | 9/2002 | Baker |
| 6,466,671 B1 | 10/2002 | Maillard et al. |
| 6,466,733 B1 | 10/2002 | Kim |
| 6,510,513 B1 | 1/2003 | Danieli |
| 6,510,554 B1 | 1/2003 | Gordon et al. |
| 6,621,979 B1 | 9/2003 | Eerenberg et al. |
| 6,625,320 B1 * | 9/2003 | Nilsson .............. H04N 19/51 375/E7.198 |
| 6,658,056 B1 | 12/2003 | Duruöz et al. |
| 6,771,703 B1 | 8/2004 | Oguz et al. |
| 6,807,306 B1 | 10/2004 | Girgensohn et al. |
| 6,810,389 B1 | 10/2004 | Meyer |
| 6,850,252 B1 | 2/2005 | Hoffberg |
| 6,859,496 B1 | 2/2005 | Boroczky et al. |
| 6,944,621 B1 | 9/2005 | Collart |
| 6,956,901 B2 | 10/2005 | Boroczky et al. |
| 6,965,724 B1 | 11/2005 | Boccon-Gibod et al. |
| 6,965,993 B2 | 11/2005 | Baker |
| 7,007,170 B2 | 2/2006 | Morten |
| 7,023,924 B1 | 4/2006 | Keller et al. |
| 7,043,473 B1 | 5/2006 | Rassool et al. |
| 7,150,045 B2 | 12/2006 | Koelle et al. |
| 7,151,832 B1 | 12/2006 | Fetkovich et al. |
| 7,151,833 B2 | 12/2006 | Candelore et al. |
| 7,165,175 B1 | 1/2007 | Kollmyer et al. |
| 7,185,363 B1 | 2/2007 | Narin et al. |
| 7,197,234 B1 | 3/2007 | Chatterton |
| 7,231,132 B1 | 6/2007 | Davenport |
| 7,242,772 B1 | 7/2007 | Tehranchi |
| 7,328,345 B2 | 2/2008 | Morten et al. |
| 7,340,528 B2 | 3/2008 | Noblecourt et al. |
| 7,349,886 B2 | 3/2008 | Morten et al. |
| 7,356,143 B2 | 4/2008 | Morten |
| 7,376,831 B2 | 5/2008 | Kollmyer et al. |
| 7,406,174 B2 | 7/2008 | Palmer |
| 7,472,280 B2 | 12/2008 | Giobbi |
| 7,478,325 B2 | 1/2009 | Foehr |
| 7,484,103 B2 | 1/2009 | Woo et al. |
| 7,499,938 B2 | 3/2009 | Collart |
| 7,526,450 B2 | 4/2009 | Hughes et al. |
| 7,594,271 B2 | 9/2009 | Zhuk et al. |
| 7,640,435 B2 | 12/2009 | Morten |
| 7,689,510 B2 | 3/2010 | Lamkin et al. |
| 7,720,352 B2 | 5/2010 | Belknap et al. |
| 7,761,892 B2 | 7/2010 | Ellis et al. |
| 7,779,097 B2 | 8/2010 | Lamkin et al. |
| 7,817,608 B2 | 10/2010 | Rassool et al. |
| 7,962,942 B1 | 6/2011 | Craner |
| 7,974,714 B2 | 7/2011 | Hoffberg |
| 7,991,156 B1 | 8/2011 | Miller |
| 8,023,562 B2 | 9/2011 | Zheludkov et al. |
| 8,046,453 B2 | 10/2011 | Olaiya |
| 8,054,880 B2 | 11/2011 | Yu et al. |
| 8,065,708 B1 | 11/2011 | Smyth et al. |
| 8,069,260 B2 | 11/2011 | Speicher et al. |
| 8,201,264 B2 | 6/2012 | Grab et al. |
| 8,225,061 B2 | 7/2012 | Greenebaum |
| 8,233,768 B2 | 7/2012 | Soroushian et al. |
| 8,245,124 B1 * | 8/2012 | Gupta .................. G11B 27/034 715/202 |
| 8,249,168 B2 | 8/2012 | Graves |
| 8,261,356 B2 | 9/2012 | Choi et al. |
| 8,265,168 B1 | 9/2012 | Masterson et al. |
| 8,270,473 B2 | 9/2012 | Chen et al. |
| 8,270,819 B2 | 9/2012 | Vannier |
| 8,289,338 B2 | 10/2012 | Priyadarshi et al. |
| 8,291,460 B1 | 10/2012 | Peacock |
| 8,311,111 B2 * | 11/2012 | Xu .................. H04N 19/51 375/240.08 |
| 8,311,115 B2 | 11/2012 | Gu et al. |
| 8,321,556 B1 | 11/2012 | Chatterjee et al. |
| 8,386,621 B2 | 2/2013 | Park |
| 8,401,900 B2 | 3/2013 | Cansler et al. |
| 8,412,841 B1 | 4/2013 | Swaminathan et al. |
| 8,452,110 B2 | 5/2013 | Shoham et al. |
| 8,456,380 B2 | 6/2013 | Pagan |
| 8,472,792 B2 | 6/2013 | Butt |
| 8,510,404 B2 | 8/2013 | Carmel et al. |
| 8,515,265 B2 | 8/2013 | Kwon et al. |
| 8,516,529 B2 | 8/2013 | Lajoie et al. |
| 8,606,069 B2 | 12/2013 | Okubo et al. |
| 8,681,866 B1 | 3/2014 | Jia |
| 8,774,609 B2 | 7/2014 | Drake et al. |
| 8,781,122 B2 | 7/2014 | Chan et al. |
| 8,805,109 B2 | 8/2014 | Shoham et al. |
| 8,843,586 B2 | 9/2014 | Pantos et al. |
| 8,908,984 B2 | 12/2014 | Shoham et al. |
| 8,914,534 B2 | 12/2014 | Braness et al. |
| 8,997,161 B2 | 3/2015 | Priyadarshi et al. |
| 9,014,471 B2 | 4/2015 | Shoham et al. |
| 9,025,659 B2 | 5/2015 | Soroushian et al. |
| 9,042,670 B2 | 5/2015 | Carmel et al. |
| 9,094,737 B2 | 7/2015 | Shivadas et al. |
| 9,197,685 B2 | 11/2015 | Soroushian et al. |
| 9,210,481 B2 | 12/2015 | Braness et al. |
| 9,264,475 B2 | 2/2016 | Shivadas et al. |
| 9,313,510 B2 | 4/2016 | Shivadas et al. |
| 2001/0036355 A1 | 11/2001 | Kelly et al. |
| 2001/0046299 A1 | 11/2001 | Wasilewski et al. |
| 2002/0051494 A1 | 5/2002 | Yamaguchi et al. |
| 2002/0057898 A1 | 5/2002 | Normile |
| 2002/0110193 A1 | 8/2002 | Yoo et al. |
| 2002/0136298 A1 | 9/2002 | Anantharamu et al. |
| 2002/0191959 A1 | 12/2002 | Lin et al. |
| 2003/0001964 A1 | 1/2003 | Masukura et al. |
| 2003/0002578 A1 | 1/2003 | Tsukagoshi et al. |
| 2003/0035488 A1 | 2/2003 | Barrau |
| 2003/0035545 A1 | 2/2003 | Jiang |
| 2003/0035546 A1 | 2/2003 | Jiang et al. |
| 2003/0061305 A1 | 3/2003 | Copley et al. |
| 2003/0061369 A1 | 3/2003 | Aksu et al. |
| 2003/0093799 A1 | 5/2003 | Kauffman et al. |
| 2003/0152370 A1 | 8/2003 | Otomo et al. |
| 2003/0163824 A1 | 8/2003 | Gordon et al. |
| 2003/0174844 A1 | 9/2003 | Candelore |
| 2003/0185542 A1 | 10/2003 | McVeigh et al. |
| 2003/0229900 A1 | 12/2003 | Reisman |
| 2003/0231863 A1 | 12/2003 | Eerenberg et al. |
| 2003/0231867 A1 | 12/2003 | Gates |
| 2003/0233464 A1 | 12/2003 | Walpole et al. |

(56) References Cited

U.S. PATENT DOCUMENTS

| | | |
|---|---|---|
| 2003/0236836 A1 | 12/2003 | Borthwick |
| 2003/0236907 A1 | 12/2003 | Stewart et al. |
| 2004/0031058 A1 | 2/2004 | Reisman |
| 2004/0081333 A1 | 4/2004 | Grab |
| 2004/0081434 A1 | 4/2004 | Jung et al. |
| 2004/0093618 A1 | 5/2004 | Baldwin et al. |
| 2004/0105549 A1 | 6/2004 | Suzuki et al. |
| 2004/0136698 A1 | 7/2004 | Mock |
| 2004/0139335 A1 | 7/2004 | Diamand et al. |
| 2004/0158878 A1 | 8/2004 | Ratnakar et al. |
| 2004/0184534 A1 | 9/2004 | Wang |
| 2004/0255115 A1 | 12/2004 | DeMello et al. |
| 2004/0255236 A1 | 12/2004 | Collart |
| 2005/0015797 A1 | 1/2005 | Noblecourt et al. |
| 2005/0038826 A1 | 2/2005 | Bae et al. |
| 2005/0071280 A1 | 3/2005 | Irwin et al. |
| 2005/0114896 A1 | 5/2005 | Hug et al. |
| 2005/0183120 A1 | 8/2005 | Jain et al. |
| 2005/0193070 A1 | 9/2005 | Brown et al. |
| 2005/0193322 A1 | 9/2005 | Lamkin et al. |
| 2005/0204289 A1 | 9/2005 | Mohammed et al. |
| 2005/0207442 A1 | 9/2005 | Zoest et al. |
| 2005/0207578 A1 | 9/2005 | Matsuyama et al. |
| 2005/0273695 A1 | 12/2005 | Schnurr |
| 2005/0275656 A1 | 12/2005 | Corbin et al. |
| 2006/0026294 A1 | 2/2006 | Virdi et al. |
| 2006/0036549 A1 | 2/2006 | Wu |
| 2006/0037057 A1 | 2/2006 | Xu |
| 2006/0052095 A1 | 3/2006 | Vazvan |
| 2006/0053080 A1 | 3/2006 | Edmonson et al. |
| 2006/0064605 A1 | 3/2006 | Giobbi |
| 2006/0078301 A1 | 4/2006 | Ikeda et al. |
| 2006/0120378 A1 | 6/2006 | Usuki |
| 2006/0129909 A1 | 6/2006 | Butt et al. |
| 2006/0173887 A1 | 8/2006 | Breitfeld et al. |
| 2006/0181965 A1 | 8/2006 | Collart |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2007/0031110 A1 | 2/2007 | Rijckaert |
| 2007/0047901 A1 | 3/2007 | Ando et al. |
| 2007/0053513 A1 | 3/2007 | Hoffberg |
| 2007/0058928 A1 | 3/2007 | Naito et al. |
| 2007/0083617 A1 | 4/2007 | Chakrabarti et al. |
| 2007/0086528 A1 | 4/2007 | Mauchly et al. |
| 2007/0136817 A1 | 6/2007 | Nguyen |
| 2007/0140647 A1 | 6/2007 | Kusunoki et al. |
| 2007/0154165 A1 | 7/2007 | Hemmeryckx-Deleersnijder et al. |
| 2007/0168541 A1 | 7/2007 | Gupta et al. |
| 2007/0168542 A1 | 7/2007 | Gupta et al. |
| 2007/0178933 A1 | 8/2007 | Nelson |
| 2007/0180125 A1 | 8/2007 | Knowles et al. |
| 2007/0192810 A1 | 8/2007 | Pritchett et al. |
| 2007/0217759 A1 | 9/2007 | Dodd |
| 2007/0234391 A1 | 10/2007 | Hunter et al. |
| 2007/0239839 A1 | 10/2007 | Buday et al. |
| 2007/0255940 A1 | 11/2007 | Ueno |
| 2007/0271317 A1 | 11/2007 | Carmel et al. |
| 2007/0274679 A1 | 11/2007 | Yahata et al. |
| 2007/0292107 A1 | 12/2007 | Yahata et al. |
| 2008/0008455 A1 | 1/2008 | De Lange et al. |
| 2008/0043832 A1 | 2/2008 | Barkley et al. |
| 2008/0101466 A1 | 5/2008 | Swenson et al. |
| 2008/0104633 A1 | 5/2008 | Noblecourt et al. |
| 2008/0120389 A1 | 5/2008 | Bassali et al. |
| 2008/0126248 A1 | 5/2008 | Lee et al. |
| 2008/0137736 A1 | 6/2008 | Richardson et al. |
| 2008/0172441 A1 | 7/2008 | Speicher et al. |
| 2008/0187283 A1 | 8/2008 | Takahashi |
| 2008/0192818 A1 | 8/2008 | DiPietro et al. |
| 2008/0195744 A1 | 8/2008 | Bowra et al. |
| 2008/0205860 A1 | 8/2008 | Holtman |
| 2008/0256105 A1 | 10/2008 | Nogawa et al. |
| 2008/0263354 A1 | 10/2008 | Beuque |
| 2008/0279535 A1 | 11/2008 | Hague et al. |
| 2008/0294453 A1* | 11/2008 | Baird-Smith ........... G06F 21/10 705/1.1 |
| 2008/0310454 A1 | 12/2008 | Bellwood et al. |
| 2008/0310496 A1 | 12/2008 | Fang |
| 2009/0031220 A1 | 1/2009 | Tranchant et al. |
| 2009/0037959 A1 | 2/2009 | Suh et al. |
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0066839 A1 | 3/2009 | Jung et al. |
| 2009/0097644 A1 | 4/2009 | Haruki |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0136216 A1 | 5/2009 | Soroushian et al. |
| 2009/0150557 A1 | 6/2009 | Wormley et al. |
| 2009/0169181 A1 | 7/2009 | Priyadarshi et al. |
| 2009/0172201 A1 | 7/2009 | Carmel et al. |
| 2009/0178090 A1 | 7/2009 | Oztaskent |
| 2009/0196139 A1 | 8/2009 | Bates et al. |
| 2009/0201988 A1 | 8/2009 | Gazier et al. |
| 2009/0226148 A1 | 9/2009 | Nesvadba et al. |
| 2009/0290706 A1 | 11/2009 | Amini et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310933 A1 | 12/2009 | Lee |
| 2009/0313544 A1 | 12/2009 | Wood et al. |
| 2009/0313564 A1 | 12/2009 | Rottler et al. |
| 2009/0316783 A1 | 12/2009 | Au et al. |
| 2009/0328124 A1 | 12/2009 | Khouzam et al. |
| 2009/0328228 A1 | 12/2009 | Schnell |
| 2010/0040351 A1 | 2/2010 | Toma et al. |
| 2010/0057928 A1 | 3/2010 | Kapoor et al. |
| 2010/0074324 A1 | 3/2010 | Qian et al. |
| 2010/0074333 A1* | 3/2010 | Au et al. .................. 375/240.12 |
| 2010/0083322 A1 | 4/2010 | Rouse |
| 2010/0094969 A1 | 4/2010 | Zuckerman et al. |
| 2010/0095121 A1 | 4/2010 | Shetty et al. |
| 2010/0107260 A1 | 4/2010 | Orrell et al. |
| 2010/0111192 A1 | 5/2010 | Graves |
| 2010/0142917 A1 | 6/2010 | Lsaji Yutaka |
| 2010/0158109 A1 | 6/2010 | Dahlby et al. |
| 2010/0161825 A1 | 6/2010 | Ronca et al. |
| 2010/0166060 A1* | 7/2010 | Ezure et al. ............. 375/240.03 |
| 2010/0186092 A1 | 7/2010 | Takechi et al. |
| 2010/0189183 A1 | 7/2010 | Gu et al. |
| 2010/0228795 A1 | 9/2010 | Hahn |
| 2010/0235472 A1 | 9/2010 | Sood et al. |
| 2010/0290761 A1 | 11/2010 | Drake et al. |
| 2010/0313225 A1 | 12/2010 | Cholas et al. |
| 2010/0313226 A1 | 12/2010 | Cholas et al. |
| 2010/0319014 A1 | 12/2010 | Lockett et al. |
| 2010/0319017 A1 | 12/2010 | Cook |
| 2011/0002381 A1* | 1/2011 | Yang et al. .............. 375/240.03 |
| 2011/0047209 A1 | 2/2011 | Lindholm et al. |
| 2011/0055585 A1 | 3/2011 | Lee |
| 2011/0066673 A1 | 3/2011 | Outlaw |
| 2011/0080940 A1 | 4/2011 | Bocharov |
| 2011/0082924 A1 | 4/2011 | Gopalakrishnan |
| 2011/0096828 A1 | 4/2011 | Chen et al. |
| 2011/0107379 A1 | 5/2011 | Lajoie et al. |
| 2011/0116772 A1 | 5/2011 | Kwon et al. |
| 2011/0126191 A1 | 5/2011 | Hughes et al. |
| 2011/0129011 A1 | 6/2011 | Cilli et al. |
| 2011/0135090 A1 | 6/2011 | Chan |
| 2011/0138018 A1 | 6/2011 | Raveendran et al. |
| 2011/0142415 A1 | 6/2011 | Rhyu |
| 2011/0145726 A1 | 6/2011 | Wei et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0184738 A1 | 7/2011 | Kalisky et al. |
| 2011/0191803 A1 | 8/2011 | Baldwin et al. |
| 2011/0197237 A1 | 8/2011 | Turner |
| 2011/0222786 A1 | 9/2011 | Carmel et al. |
| 2011/0225315 A1 | 9/2011 | Wexler et al. |

(56) References Cited

U.S. PATENT DOCUMENTS

| | | |
|---|---|---|
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0252118 A1 | 10/2011 | Pantos et al. |
| 2011/0264530 A1 | 10/2011 | Santangelo et al. |
| 2011/0268178 A1 | 11/2011 | Park |
| 2011/0291723 A1 | 12/2011 | Hashimoto |
| 2011/0302319 A1 | 12/2011 | Ha et al. |
| 2011/0305273 A1 | 12/2011 | He |
| 2011/0314176 A1 | 12/2011 | Frojdh et al. |
| 2011/0314500 A1 | 12/2011 | Gordon |
| 2012/0005368 A1 | 1/2012 | Knittle et al. |
| 2012/0023251 A1 | 1/2012 | Pyle et al. |
| 2012/0036544 A1 | 2/2012 | Chen et al. |
| 2012/0093214 A1 | 4/2012 | Urbach |
| 2012/0114302 A1* | 5/2012 | Randall .......... G11B 27/105 386/241 |
| 2012/0144445 A1 | 6/2012 | Bonta et al. |
| 2012/0170642 A1 | 7/2012 | Braness |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | van Der Schaar |
| 2012/0179834 A1 | 7/2012 | van Der Schaar |
| 2012/0201475 A1 | 8/2012 | Carmel et al. |
| 2012/0201476 A1 | 8/2012 | Carmel et al. |
| 2012/0233345 A1 | 9/2012 | Hannuksela |
| 2012/0254455 A1 | 10/2012 | Adimatyam et al. |
| 2012/0260277 A1 | 10/2012 | Kosciewicz |
| 2012/0263434 A1 | 10/2012 | Wainner et al. |
| 2012/0278496 A1 | 11/2012 | Hsu |
| 2012/0294355 A1 | 11/2012 | Holcomb et al. |
| 2012/0307883 A1 | 12/2012 | Graves |
| 2012/0311094 A1 | 12/2012 | Biderman et al. |
| 2012/0314778 A1 | 12/2012 | Salustri et al. |
| 2013/0007223 A1 | 1/2013 | Luby et al. |
| 2013/0019107 A1 | 1/2013 | Grab et al. |
| 2013/0041808 A1 | 2/2013 | Pham et al. |
| 2013/0044821 A1 | 2/2013 | Braness et al. |
| 2013/0046902 A1 | 2/2013 | Villegas Nunez et al. |
| 2013/0051554 A1 | 2/2013 | Braness |
| 2013/0054958 A1 | 2/2013 | Braness et al. |
| 2013/0058480 A1 | 3/2013 | Ziskind et al. |
| 2013/0061040 A1 | 3/2013 | Kiefer et al. |
| 2013/0061045 A1 | 3/2013 | Kiefer et al. |
| 2013/0064466 A1 | 3/2013 | Carmel et al. |
| 2013/0094565 A1 | 4/2013 | Yang et al. |
| 2013/0097309 A1 | 4/2013 | Ma et al. |
| 2013/0114944 A1 | 5/2013 | Soroushian et al. |
| 2013/0152767 A1 | 6/2013 | Katz et al. |
| 2013/0166765 A1 | 6/2013 | Kaufman |
| 2013/0166906 A1 | 6/2013 | Swaminathan et al. |
| 2013/0170764 A1 | 7/2013 | Carmel et al. |
| 2013/0182952 A1 | 7/2013 | Carmel et al. |
| 2013/0223812 A1 | 8/2013 | Rossi |
| 2013/0226578 A1 | 8/2013 | Bolton et al. |
| 2013/0311670 A1 | 11/2013 | Tarbox et al. |
| 2013/0329781 A1 | 12/2013 | Su et al. |
| 2014/0003516 A1 | 1/2014 | Soroushian |
| 2014/0101722 A1 | 4/2014 | Moore |
| 2014/0119432 A1 | 5/2014 | Wang et al. |
| 2014/0140396 A1 | 5/2014 | Wang et al. |
| 2014/0140417 A1 | 5/2014 | Shaffer et al. |
| 2014/0143440 A1 | 5/2014 | Ramamurthy et al. |
| 2014/0177734 A1 | 6/2014 | Carmel et al. |
| 2014/0189065 A1 | 7/2014 | van Der Schaar et al. |
| 2014/0201382 A1 | 7/2014 | Shivadas et al. |
| 2014/0211859 A1 | 7/2014 | Carmel et al. |
| 2014/0241420 A1 | 8/2014 | Orton-jay et al. |
| 2014/0241421 A1 | 8/2014 | Orton-jay et al. |
| 2014/0250473 A1 | 9/2014 | Braness et al. |
| 2014/0269936 A1 | 9/2014 | Shivadas et al. |
| 2014/0297804 A1 | 10/2014 | Shivadas et al. |
| 2014/0355668 A1 | 12/2014 | Carmel et al. |
| 2014/0359678 A1 | 12/2014 | Shivadas et al. |
| 2014/0359679 A1 | 12/2014 | Shivadas et al. |
| 2014/0359680 A1 | 12/2014 | Shivadas et al. |
| 2015/0049957 A1 | 2/2015 | Carmel et al. |
| 2015/0063693 A1 | 3/2015 | Carmel et al. |
| 2015/0334435 A1 | 11/2015 | Shivadas et al. |

FOREIGN PATENT DOCUMENTS

| | | |
|---|---|---|
| EP | 0936812 A1 | 8/1999 |
| EP | 1056273 A2 | 11/2000 |
| EP | 1553779 A1 | 7/2005 |
| EP | 2486517 A1 | 8/2012 |
| EP | 2486727 A1 | 8/2012 |
| EP | 2564354 A1 | 3/2013 |
| EP | 2616991 A2 | 7/2013 |
| EP | 2617192 A2 | 7/2013 |
| EP | 2486727 A4 | 3/2014 |
| EP | 2564354 A4 | 3/2014 |
| EP | 2616991 | 3/2014 |
| EP | 2617192 A4 | 3/2014 |
| EP | 2716048 A1 | 4/2014 |
| EP | 2721826 A1 | 4/2014 |
| EP | 2486517 A4 | 6/2014 |
| EP | 2751990 | 7/2014 |
| EP | 2807821 A2 | 12/2014 |
| EP | 2751990 A4 | 4/2015 |
| JP | 08046902 A | 2/1996 |
| JP | 8111842 A | 4/1996 |
| JP | 09037225 A | 2/1997 |
| JP | 11164307 A | 6/1999 |
| JP | 11275576 A | 10/1999 |
| JP | 2001346165 A | 12/2001 |
| JP | 2002518898 A | 6/2002 |
| JP | 2004013823 A | 1/2004 |
| JP | 2004515941 A | 5/2004 |
| JP | 2004172830 A | 6/2004 |
| JP | 2004187161 A | 7/2004 |
| JP | 2007036666 A | 2/2007 |
| JP | 2007235690 A | 9/2007 |
| JP | 2007535881 A | 12/2007 |
| JP | 2014506430 A | 3/2014 |
| KR | 669616 | 9/2007 |
| WO | 1996013121 | 5/1996 |
| WO | 9731445 A3 | 4/1998 |
| WO | 9910836 A1 | 3/1999 |
| WO | 9965239 A2 | 12/1999 |
| WO | 0165762 A2 | 9/2001 |
| WO | 0235832 A2 | 5/2002 |
| WO | 0237210 A2 | 5/2002 |
| WO | 02054196 A2 | 7/2002 |
| WO | 2004102571 A1 | 11/2004 |
| WO | 2006018843 A2 | 2/2006 |
| WO | 2006018843 A3 | 12/2006 |
| WO | 2007113836 A2 | 10/2007 |
| WO | 2007113836 A3 | 11/2008 |
| WO | 2007113836 B1 | 12/2008 |
| WO | 2009065137 A1 | 5/2009 |
| WO | 2010060106 A1 | 5/2010 |
| WO | 2010089962 A1 | 8/2010 |
| WO | 2010122447 A1 | 10/2010 |
| WO | 2010147878 A1 | 12/2010 |
| WO | 2011042898 A1 | 4/2011 |
| WO | 2011042900 A1 | 4/2011 |
| WO | 2011068668 A1 | 6/2011 |
| WO | 2011103364 A1 | 8/2011 |
| WO | 2011132184 A1 | 10/2011 |
| WO | 2011135558 A1 | 11/2011 |
| WO | 2012035533 A2 | 3/2012 |
| WO | 2012035534 A2 | 3/2012 |
| WO | 2012035534 A3 | 7/2012 |
| WO | 2012094171 A1 | 7/2012 |
| WO | 2012094181 A2 | 7/2012 |
| WO | 2012094189 A1 | 7/2012 |
| WO | 2012035533 A3 | 8/2012 |
| WO | 2012162806 A1 | 12/2012 |
| WO | 2012171113 A1 | 12/2012 |
| WO | 2013030833 A1 | 3/2013 |

(56) References Cited

FOREIGN PATENT DOCUMENTS

| WO | 2013032518 A2 | 3/2013 |
|---|---|---|
| WO | 2013111126 A2 | 8/2013 |
| WO | 2013111126 A3 | 8/2013 |
| WO | 2013032518 A3 | 9/2013 |
| WO | 2013144942 A1 | 10/2013 |
| WO | 2015031982 A1 | 3/2015 |

OTHER PUBLICATIONS

U.S. Appl. No. 13/224,298, "Final Office Action Received", dated May 19, 2014, 27 pgs.
U.S. Appl. No. 13/905,804, "Non-Final Office Action Received", dated Jul. 25, 2014, 15 pgs.
U.S. Appl. No. 13/905,804, "Notice of Allowance", dated Aug. 12, 2015, 8 pgs.
Akhshabi et al., "An Experimental Evaluation of Rate-Adaptation Algorithms in Adaptive Streaming over HTTP", MMSys'11, Feb. 23-25, 2011, 12 pgs.
Anonymous, "Method for the encoding of a compressed video sequence derived from the same video sequence compressed at a different bit rate without loss of data", ip.com, ip.com No. IPCOM000008165D, May 22, 2002, pp. 1-9.
Author Unknown, "Blu-ray Disc—Blu-ray Disc—Wikipedia, the free encyclopedia", printed Oct. 30, 2008 from http://en.wikipedia.org/wiki/Blu-ray_Disc, 11 pgs.
Author Unknown, "Blu-ray Movie Bitrates Here—Blu-ray Forum", printed Oct. 30, 2008 from http://forum.blu-ray.com/showthread.php?t=3338, 6 pgs.
Author Unknown, "MPEG-4 Video Encoder: Based on International Standard ISO/IEC 14496-2", Patni Computer Systems, Ltd., Publication date unknown, 15 pgs.
Author Unknown, "O'Reilly—802.11 Wireless Networks: The Definitive Guide, Second Edition", printed Oct. 30, 2008 from http://oreilly.com/catalog/9780596100520, 2 pgs.
Author Unknown, "Tunneling QuickTime RTSP and RTP over HTTP", Published by Apple Computer, Inc.: 1999 (month unknown), 6 pages.
Author Unknown, "Turbo-Charge Your Internet and PC Performance", printed Oct. 30, 2008 from Speedtest.net—The Global Broadband Speed Test, 1 pg.
Author Unknown, "When is 54 Not Equal to 54? a Look at 802.11a, b and g Throughput", printed Oct. 30, 2008 from www.oreillynet.com/pub/a/wireless/2003/08/08/wireless_throughput.html, 4 pgs.
Author Unknown, "White paper, The New Mainstream Wireless LAN Standard", Broadcom Corporation, Jul. 2003, 12 pgs.
Blasiak, Ph.D., Darek "Video Transrating and Transcoding: Overview of Video Transrating and Transcoding Technologies,", Ingenient Technologies, TI Developer Conference, Aug. 6-8, 2002, 22 pgs.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.
Gannes, "The Lowdown on Apple's HTTP Adaptive Bitrate Streaming", GigaOM, Jun. 10, 2009, 12 pgs.
Garg et al., "An Experimental Study of Throughput for UDP and VoIP Traffic in IEEE 802.11b Networks", Wireless Communications and Networkings, Mar. 2003, pp. 1748-1753.
Ghosh, "Enhancing Silverlight Video Experiences with Contextual Data", Retrieved from: http://msdn.microsoft.com/en-us/magazine/ee336025.aspx, 15 pgs.
Inlet Technologies, "Adaptive Delivery to iDevices", 2 pages.
Inlet Technologies, "Adaptive delivery to iPhone 3.0", 2 pgs.
Inlet Technologies, "HTTP versus RTMP", 3 page.
Inlet Technologies, "The World's First Live Smooth Streaming Event: The French Open", 2 pages.
Kim, Kyuheon, "MPEG-2 ES/PES/TS/PSI", Kyung-Hee University, Oct. 4, 2010, 66 pages.
Kozintsev et al., "Improving last-hop multicast streaming video over 802.11", Workshop on Broadband Wireless Multimedia, Oct. 2004, pp. 1-10.
Kurzke et al., "Get Your Content Onto Google TV", Google, Retrieved from: http://commondatastorage.googleapis.com/io2012/presentations/live%20to%20website/1300.pdf, 58 pgs.
Lang, "Expression Encoder, Best Practices for live smooth streaming broadcasting", Microsoft Corporation, 20 pgs.
Levkov, "Mobile Encoding Guidelines for Android Powered Devices", Adobe Systems Inc., Addendum B, source and date unknown, 42 pgs.
MSDN, "Adaptive streaming, Expression Studio 2.0", 2 pgs.
Nelson, "Smooth Streaming Deployment Guide", Microsoft Expression Encoder, Aug. 2010, 66 pgs.
Nelson, Mark "Arithmetic Coding+ Statistical Modeling= Data Compression: Part 1—Arithmetic Coding", Doctor Dobb's Journal, Feb. 1991, printed from http://www.dogma.net/markn/articles/arith/part1.htm; printed Jul. 2, 2003, 12 pgs.
Nelson, Michael, "IBM's Cryptolopes", Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pages.
Noe, A.,"Matroska File Format (under construction!)", Retrieved from the Internet: URL:http://web.archive.orgweb/20070821155146/www.matroska.org/technical/specs/matroska.pdf [retrieved on Jan. 19, 2011], Jun. 24, 2007, 1-51.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pantos, R., "HTTP Live Streaming: draft-pantos-http-live-streaming-06", Published by the Internet Engineering Task Force (IETF), Mar. 31, 2011, 24 pages.
Papagiannaki et al., "Experimental Characterization of Home Wireless Networks and Design Implications", INFOCOM 2006, 25th IEEE International Conference of Computer Communications, Proceedings, Apr. 2006, 13 pgs.
Phamdo, Nam, "Theory of Data Compression", printed from http://www.data-compression.com/theoroy.html on Oct. 10, 2003, 12 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Schulzrinne, H et al., "Real Time Streaming Protocol 2.0 (RTSP): draft-ietfmmusic-rfc2326bis-27", Music Working Group of the Internet Engineering Task Force (IETF), Mar. 9, 2011, 296 pages.
Siglin, "HTTP Streaming: What You Need to Know", streamingmedia.com, 2010, 15 pages.
Siglin, "Unifying Global Video Strategies, MP4 File Fragmentation for Broadcast, Mobile and Web Delivery", Nov. 16, 2011, 16 pgs.
Tan, Yap-Peng et al., "Video transcoding for fast forward/reverse video playback", IEEE ICIP, 2002, pp. 1-713 to 1-716.
Unknown, "Entropy and Source Coding (Compression)", TCOM 570, 1999-9, pp. 1-22.
Wang et al., "Image Quality Assessment: From Error Visibility to Structural Similarity", IEEE Transactions on Image Processing, Apr. 2004, vol. 13, No. 4, pp. 600-612.
Wu, Feng et al., "Next Generation Mobile Multimedia Communications: Media Codec and Media Transport Perspectives", In China Communications, Oct. 2006, pp. 30-44.
Zambelli, Alex, "IIS Smooth Streaming Technical Overview", Microsoft Corporation, Mar. 2009, 17 pgs.
"IBM Closes Cryptolopes Unit," Dec. 17, 1997, CNET News, Printed on Apr. 25, 2014 from http://news.cnet.com/IBM-closes-Cryptolopes-unit/2100-1001_3206465.html, 3 pages.
"Information Technology-Coding of Audio Visual Objects—Part 2: Visual" International Standard, ISO/IEC 14496-2, Third Edition, Jun. 1, 2004, pp. 1-724.

(56) References Cited

OTHER PUBLICATIONS

Cloakware Corporation, "Protecting Digital Content Using Cloakware Code Transformation Technology", Version 1.2, May 2002, pp. 1-10.
European Search Report Application No. EP 08870152, Search Completed May 19, 2011, dated May 26, 2011, 10 pgs.
European Search Report for Application 11855103.5, search completed Jun. 26, 2014, 10 pgs.
European Search Report for Application 11855237.1, search completed Jun. 12, 2014, 9 pgs.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
Informationweek: Front End: Daily Dose, "Internet on Wheels", Jul. 20. 1999, Printed on Mar. 26, 2014, 3 pgs.
International Preliminary Report on Patentability for International Application No. PCT/US2011/068276, International Filing Date Dec. 31, 2011, dated Mar. 4, 2014, 23 pgs.
International Preliminary Report on Patentability for International Application PCT/US2013/043181, Report issued Dec. 31, 2014, dated Jan. 8, 2015, 11 Pgs.
International Search Report for International Application No. PCT/US08/87999, completed Feb. 7, 2009, dated Mar. 19, 2009, 2 pgs.
International Search Report for International Application No. PCT/US07/63950, completed Feb. 19, 2008; dated Mar. 19, 2008, 3 pgs.
International Search Report and Written Opinion for International Application No. PCT/US2010/56733, Completed Jan. 3, 2011, dated Jan. 14, 2011, 9 pgs.
International Search Report and Written Opinion for International Application No. PCT/US2013/043181, International Filing Date May 29, 2013, Search Completed Nov. 27, 2013, dated Dec. 6, 2013, 12 pgs.
International Search Report and Written Opinion for International Application PCT/US2011/066927, International Filing Date Dec. 22, 2011, Report Completed Apr. 3, 2012, dated Apr. 20, 2012, 14 pgs.
International Search Report and Written Opinion for International Application PCT/US2011/067167, International Filing Date Dec. 23, 2011, Report Completed Jun. 19, 2012, dated Jul. 2, 2012, 11 pgs.
International Search Report and Written Opinion for International Application PCT/US2011/068276, International Filing Date Dec. 31, 2011, Report completed Jun. 19, 2013, dated Jul. 8, 2013, 25 pgs.
International Search Report for International Application No. PCT/US2005/025845 filed Jul. 21, 2005, report completed Feb. 5, 2007 and dated May 10, 2007, 3 pgs.
ITS International, "Fleet System Opts for Mobile Server", Aug. 26, 1999, Printed on Oct. 21, 2011 from http://www.itsinternational.com/News/article.cfm?recordID=547, 1 page.
Microsoft, Microsoft Media Platform: Player Framework, "Silverlight Media Framework v1.1", 2 pages.
Microsoft, Microsoft Media Platform: Player Framework, "Microsoft Media Platform: Player Framework v2.5 (formerly Silverlight Media Framework)", 2 pages.
Office Action for U.S. Appl. No. 13/223,210, dated Apr. 30, 2015, 14 pgs.
Office Action for U.S. Appl. No. 14/564,003, dated Apr. 17, 2015, 28 pgs.
The Official Microsoft IIS Site, "Smooth Streaming Client," 4 pages.
Written Opinion for International Application No. PT/US2005/025845 filed Jul. 21, 2005, report completed Feb. 5, 2007 and dated May 10, 2007, 5 pgs.
Written Opinion for International Application No. PCT/US2007/063950 filed Mar. 14, 2007, report completed Mar. 1, 2008; report dated Mar. 19, 2008, 6 pgs.
Written Opinion of the International Searching Authority for International Application No. PCT/US08/87999, date completed Feb. 7, 2009, dated Mar. 19, 2009, 4 pgs.
"Adaptive Streaming Comparison", Jan. 28, 2010, 5 pgs.
"Best Practices for Multi-Device Transcoding", Kaltura Open Source Video, Printed on Nov. 27, 2013 from knowledge.kaltura.com/best-practices-multi-device-transcoding, 13 pgs.
"IBM Spearheading Intellectual Property Protection Technology for Information on the Internet; Cryptolope Containers Have Arrived", May 1, 1996, Business Wire, Printed on Aug. 1, 2014 from http://www.thefreelibrary.com/IBM+Spearheading+Intellectual+Property+Protection+Technology+for...-a018239381, 6pg.
"Netflix turns on subtitles for PC, Mac streaming", Printed on Mar. 26, 2014, 3 pgs.
Supplementary European Search Report for Application No. EP 10834935, International Filing Date Nov. 15, 2010, Search Completed May 27, 2014, 9 pgs.
"Supported Media Formats", Supported Media Formats, Android Developers, Printed on Nov. 27, 2013 from.developer.android.com/guide/appendix/media-formats.html, 3 pgs.
"Thread: SSME (Smooth Streaming Medial Element) config.xml review (Smooth Streaming Client configuration file)", printed Mar. 26, 2014 from, 3 pgs.
"Transcoding Best Practices", From movideo, Printed on Nov. 27, 2013 from code.movideo.com/Transcoding_Best_Practices, 5 pgs.

\* cited by examiner

SYSTEMS, METHODS, AND MEDIA FOR TRANSCODING VIDEO DATA ACCORDING TO ENCODING PARAMETERS INDICATED BY RECEIVED METADATA

BACKGROUND OF THE INVENTION

Transcoding is an important task in video distribution applications. For example, a transcoder can receive input video data having a first format and convert the input video data into video data having a second format. More particularly, for example, the first format and the second format can correspond to different video coding standards, such as Motion JPEG, JPEG 2000, MPEG-2, MPEG-4, H.263, H.264, AVC, High Efficiency Video Coding (HEVC), etc. Alternatively or additionally, the first format and the second format can have different bitrates and/or resolutions.

There are many current approaches to transcoding video data. For example, a transcoder can decode video data compressed in a first format into raw video data and re-encode the raw video data into a second format. More particularly, for example, the transcoder can estimate encoding parameters and re-encode the raw video data using the estimated encoding parameters. The estimation of encoding parameters within a transcoder is very time-consuming.

Accordingly, new mechanisms for transcoding video data are desirable.

SUMMARY OF THE INVENTION

In view of the foregoing, systems, methods, and media for transcoding video data using metadata are provided.

In some embodiments, methods for transcoding video data using metadata are provided, the methods comprising: receiving a first plurality of encoded images from a storage device; decoding the first plurality of encoded images based on a first coding scheme to generate a plurality of decoded images; receiving a plurality of encoding parameters from the storage device; and encoding the plurality of decoded images into a second plurality of encoded images based on a second coding scheme and the plurality of encoding parameters.

In some embodiments, systems for transcoding video data using metadata are provided, the systems comprising: processing circuitry configured to: receive a first plurality of encoded images from a storage device; decode the first plurality of encoded images based on a first coding scheme to generate a plurality of decoded images; receive a plurality of encoding parameters from the storage device; and encode the plurality of decoded images into a second plurality of encoded images based on a second coding scheme and the plurality of encoding parameters.

In some embodiments, non-transitory media containing computer-executable instructions that, when executed by a processing circuitry, cause the processing circuitry to performing a method for transcoding video data are provided, the method comprising: receiving a first plurality of encoded images from a storage device; decoding the first plurality of encoded images based on a first coding scheme to generate a plurality of decoded images; receiving a plurality of encoding parameters from the storage device; and encoding the plurality of decoded images into a second plurality of encoded images based on a second coding scheme and the plurality of encoding parameters.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

This invention generally relates to mechanisms (which can be systems, methods, media, etc.) for transcoding video data based on metadata. In some embodiments, the mechanisms can be used to transcode video data having a first format into video data having a second format.

In some embodiments, the mechanisms can receive a compressed bitstream and media metadata. The mechanisms can decompress the compressed bitstream and generate decoded video data based on a first coding scheme. The mechanisms can then encode the decoded video data based on a second coding scheme.

In some embodiments, the media metadata can include any suitable data. For example, the media metadata can include a set of coding parameters that can be used to encoding video data. More particularly, the media metadata can include information about one or more video scenes, such as a scene change indication signal, the number of frames between two scenes, the type of a video scene, etc. The media metadata can also include motion data, intra-prediction information, picture complexity information, etc. about video data.

In some embodiments, the mechanisms can encode the decoded video data using the media content data. For example, the mechanisms can generate a prediction image based on the motion data, the intra-prediction information, etc. As another example, the mechanisms can perform rate-control on the decoded video data based on the information about the video scenes, picture complexity information, etc.

Figure 1:
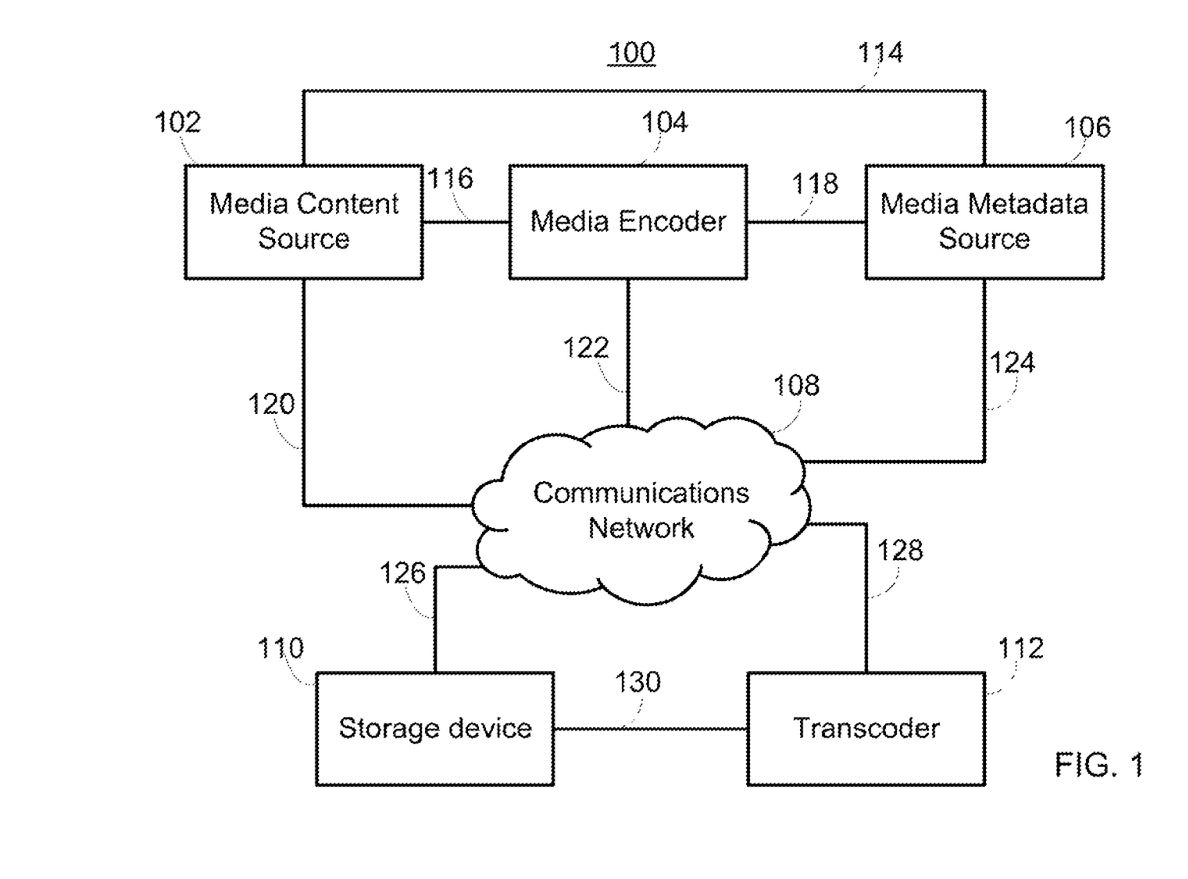
FIG. 1 shows a generalized block diagram of an example of an architecture of hardware that can be used in accordance with some embodiments of the invention.

Turning to FIG. 1, a generalized block diagram of an example 100 of an architecture of hardware that can be used in accordance with some embodiments is shown. As illustrated, architecture 100 can include a media content source 102, a media encoder 104, a media metadata source 106, a communications network 108, a storage device 110, a transcoder 112, and communications paths 114, 116, 118, 120, 122, 124, 126, 128, and 130.

Media content source 102 can include any suitable device that can provide media content. For example, media content source 102 can include one or more suitable cameras that can be configured to capture still images or moving images. As another example, media content source 102 can include one or more types of content distribution equipment for distributing any suitable media content, including television distribution facility equipment, cable system head-end equipment, satellite distribution facility equipment, programming source equipment (e.g., equipment of television broadcasters, such as NBC, ABC, HBO, etc.), intermediate distribution facility equipment, Internet provider equipment, on-demand media server equipment, and/or any other suitable media content provider equipment. NBC is a trademark owned by the National Broadcasting Company, Inc., ABC is a trademark owned by the ABC, INC., and HBO is a trademark owned by the Home Box Office, Inc.

Media content source 102 may be operated by the originator of content (e.g., a television broadcaster, a Webcast provider, etc.) or may be operated by a party other than the originator of content (e.g., an on-demand content provider, an Internet provider of content of broadcast programs for downloading, etc.).

Media content source 102 may be operated by cable providers, satellite providers, on-demand providers, Internet providers, providers of over-the-top content, and/or any other suitable provider(s) of content.

Media content source 102 may include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

As referred to herein, the term "media content" or "content" should be understood to mean one or more electronically consumable media assets, such as television programs, pay-per-view programs, on-demand programs (e.g., as provided in video-on-demand (VOD) systems), Internet content (e.g., streaming content, downloadable content, Webcasts, etc.), movies, films, video clips, audio, audio books, and/or any other media or multimedia and/or combination of the same. As referred to herein, the term "multimedia" should be understood to mean media content that utilizes at least two different content forms described above, for example, text, audio, images, video, or interactivity content forms. Media content may be recorded, played, displayed or accessed by user equipment devices, but can also be part of a live performance. In some embodiments, media content can include over-the-top (OTT) content. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC.

Media content can be provided from any suitable source in some embodiments. In some embodiments, media content can be electronically delivered to a user's location from a remote location. For example, media content, such as a Video-On-Demand movie, can be delivered to a user's home from a cable system server. As another example, media content, such as a television program, can be delivered to a user's home from a streaming media provider over the Internet.

Media encoder 104 can include any suitable circuitry that is capable of encoding media content. For example, media encoder 104 can include one or more suitable video encoders, audio encoders, video decoders, audio decoders, etc. More particularly, for example, media encoder 104 can include one or more video encoders that can encode video data including a set of images in accordance with a suitable coding standard, such as Motion JPEG, JPEG 2000, MPEG-2, MPEG-4, H.263, H.264, AVC, High Efficiency Video Coding (HEVC), etc. As referred to herein, an image can have any suitable size and shape. For example, an image can be a frame, a field, or any suitable portion of a frame or a field, such as a slice, a block, a macroblock, a set of macroblocks, a coding tree unit (CTU), a coding tree block (CTB), etc.

Media metadata source 106 can include any suitable circuitry that is capable of providing metadata for media content. The metadata for media content can include any suitable information about the media content. For example, the metadata can include one or more coding parameters that can be used by suitable encoding circuitry and/or suitable decoding circuitry to encode and/or decode video data including multiple video frames.

In a more particular example, the metadata can include information about one or more video scenes, each of which can be composed of a set of images that have similar content. More particularly, for example, the metadata can include scene change information that can indicate the start and/or end of one or more scene changes in the video data. In some embodiments, the metadata can also include a set of parameters that can indicate the type of each of the scene changes, such as a shot change, a fading change, a dissolving change, etc. In some embodiments, the metadata can include the number of images between two scene changes. For example, the metadata can include the number of images between two consecutive scene changes, two scene changes of a given type (e.g., such as two shot changes), etc.

In another more particular example, the media metadata can include picture complexity information. The picture complexity information can include any suitable information about the spatial and/or temporal complexity of an image, such as a frame, a field, a slice, a macroblock, a sub-macroblock, a CTU, a CTB, etc.

In some embodiments, for example, the picture complexity information can include spatial complexity of an image that can indicate the amount of intra-distortion across the image. The amount of intra-distortion can be measured in any suitable manner. For example, the amount of intra-distortion of the image can be measured based on the variances of pixel values, luminance, brightness, or other characteristics of the image using a suitable metric, such as the mean absolute difference (MAD), the mean square error (MSE), etc. In some embodiments, the spatial complexity of a frame can be measured using the sum of the spatial complexity of the macroblocks and/or CTUs of the frame. In some embodiments, the picture complexity information can include a map of spatial complexity distribution within a frame for each frame of the video data.

In some embodiments, for example, the picture complexity information can include temporal complexity of an image that can indicate the amount of motion between the image and one or more reference images. The amount of motion can be represented in any suitable manner. For example, the amount of motion between the image and a reference can be measured using a suitable difference metric, such as the sum of the absolute difference (SAD), the sum of the squared difference (SSD), the mean absolute difference (MAD), the sum of absolute transformed differences (SATD), etc. More particularly, for example, the temporal complexity of a frame can be represented as the SAD, SSD, MAD, SATD, etc. between two consecutive frames. In some embodiments, the picture complexity information can include a map of temporal complexity distribution within a frame for each frame of the video data.

In yet another more particular example, the metadata can include motion data about the video data. The motion data can be generated in any suitable manner and can include any suitable data about changes among video frames due to object motions, camera motions, uncovered regions, lighting changes, etc. More particularly, for example, media metadata source 106 can generate a motion vector map for each video frame of the media content, motion characteristics (e.g., high motion, slow motion, etc.) of one or a set of frames, the number of B-frames between two P-frames, etc. In some embodiments, the motion data can be generated based on a suitable motion estimation algorithm, such as a block matching algorithm, an optical flow algorithm, a sub-pixel motion estimation algorithm, a hieratical block matching algorithm, etc. For example, in some embodiments, the motion vector map can include a set of integer vectors corresponding to each integer pixel of a video frame. As another example, the motion vector map can include a set of fractional motion vectors corresponding to each sub-pixel of the video frame (e.g., ½ pixel, ¼ pixel, ⅛ pixel, etc.). In some embodiments, the media metadata can also include one or more reference lists that can contain a set of frames that can serve as reference frames.

As yet another example, the media metadata can include intra-prediction data about the media content. The intra prediction data can include any suitable data that can be used for intra prediction under a suitable coding standard. For example, the intra-prediction data can include a set of candidate intra prediction modes, such as a vertical mode, a horizontal mode, a DC mode, a diagonal down-left mode, a diagonal down-right mode, a vertical-right mode, a horizontal-down node, a vertical-left mode, a horizontal-up mode, a plane mode, an intra-angular mode, etc. Additionally, the intra-prediction data can include a coding cost and/or distortion corresponding to each intra-prediction mode.

In some embodiments, the media metadata can be stored based on the play order of the video frames.

Storage device 110 can be any suitable digital storage mechanism in some embodiments. For example, storage 110 can include any device for storing electronic data, program instructions, computer software, firmware, register values, etc., such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 110 may be used to store media content, media metadata, media guidance data, executable instructions (e.g., programs, software, scripts, etc.) for providing an interactive media guidance application, and for any other suitable functions, and/or any suitable data or program code, in accordance with some embodiments. Nonvolatile memory may also be used (e.g., to launch a boot-up routine and other instructions), in some embodiments. In some embodiments, storage 110 can store media content, encoded video data, and/or metadata provided by media content source 102, media encoder 104, and/or media metadata source 106.

Transcoder 112 can include any suitable circuitry that is capable of converting input media content having a first format into media content having a second format. For example, transcoder 112 can include a suitable video transcoder that can convert a first set of images that are encoded in accordance with a first coding scheme into a second set of images that are encoded in accordance with a second coding scheme. In some embodiments, the first coding scheme and the second coding scheme may have different target bitrates. In some embodiments, the first set of encoded images and the second set of encoded images may have different resolutions, such as spatial resolutions, temporal resolutions, quality resolutions, etc. In some embodiments, the first coding scheme and the second coding scheme may correspond to different coding standards, such as Motion JPEG, JPEG 2000, MPEG-2, MPEG-4/AVC, H.263, H.264, High Efficiency Video Coding (HEVC), etc. More particularly, for example, in some embodiments, transcoder 112 can convert a set of images encoded based on MPEG-2 standard into a set of images encoded based on HEVC standard.

In some embodiments, communications network 108 may be any one or more networks including the Internet, a mobile phone network, a mobile voice, a mobile data network (e.g., a 3G, 4G, or LTE network), a cable network, a satellite network, a public switched telephone network, a local area network, a wide area network, a fiber-optic network, any other suitable type of communications network, and/or any suitable combination of communications networks.

In some embodiments, media content source 102, media encoder 104, media metadata source 106, storage device 110, and transcoder 112 can be implemented in any suitable hardware. For example, each of media content source 102, media encoder 104, media metadata source 106, storage 126, and transcoder 112 can be implemented in any of a general purpose device such as a computer or a special purpose device such as a client, a server, mobile terminal (e.g., mobile phone), etc. Any of these general or special purpose devices can include any suitable components such as a hardware processor (which can be a microprocessor, digital signal processor, a controller, etc.).

In some embodiments, each of media content source 102, media encoder 104, media metadata source 106, storage device 110, and transcoder 112 can be implemented as a stand-alone device or integrated with other components of architecture 100.

In some embodiments, media content source 102 can be connected to media metadata source 106 through communications path 114. In some embodiments, media encoder 104 can be connected to media content source 102 and media metadata source 106 through communications paths 116 and 118, respectively. In some embodiments, communications network 108 can be connected to media content source 102, media encoder 104, media metadata source 106, storage device, and transcoder 112 through communications paths 120, 122, 124, 126, and 128, respectively. In some embodiments, storage device 110 can be connected to transcoder 112 through communications path 130.

Communications paths 116, 118, 120, 122, 124, 126, 128, and 130 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths, in some embodiments.

Figure 2:
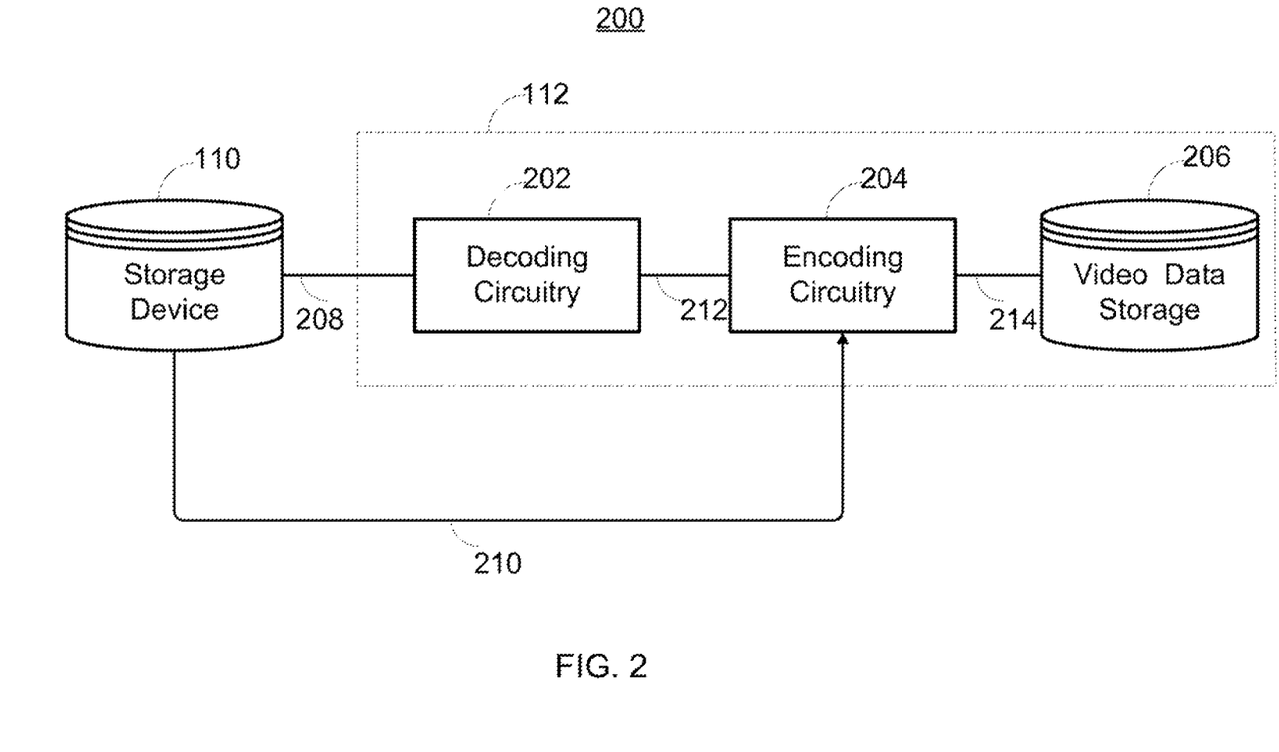
FIG. 2 shows a block diagram of an example of storage device and transcoder in accordance with some embodiments of the invention.

Turning to FIG. 2, a block diagram of an example 200 of storage device 110 and transcoder 112 of FIG. 1 in accordance with some embodiments of the disclosure is shown.

As illustrated, transcoder 112 may include a decoding circuitry 202, an encoding circuitry 204, a video-data storage 206, and communication paths 208, 210, 212, and 214.

Decoding circuitry 202 can include any suitable circuitry that is capable of performing video decoding. For example, decoding circuitry 202 can include one or more decoders that can decode a set of encoded images based on a suitable coding standard, such as MPEG-2, MPEG-4, AVC, H.263, H.264, HEVC, etc.

Encoding circuitry 204 can include any suitable circuitry that is capable of performing video encoding. For example, encoding circuitry 204 can include one or more suitable encoders that can encode a set of images based on a suitable coding standard, such as MPEG-2, MPEG-4, AVC, H.263, H.264, HEVC, etc. In some embodiments, encoding circuitry 204 can also include scaler circuitry for upconverting and/or downconverting content into a preferred output format.

Decoding circuitry 202 can be connected to encoding circuitry 204 through communication path 210. Encoding circuitry 204 can be connected to video storage 206 through communication path 214. Transcoder 112 may be connected to media storage 110 through communication paths 208 and 212.

Each of decoding circuitry 202 and encoding circuitry 204 can include any suitable processing circuitry. As referred to herein, processing circuitry can be any suitable circuitry that includes one or more microprocessors, microcontrollers, digital signal processors, programmable logic devices, field-programmable gate arrays (FPGAs), application-specific integrated circuits (ASICs), hardware processors, etc., and may include a multi-core processor (e.g., dual-core, quad-core, hexa-core, or any suitable number of cores) or a supercomputer, in some embodiments. In some embodiments, processing circuitry may be distributed across multiple separate processors or processing units, such as, for example, multiple of the same type of processing units (e.g., two Intel Core i7 processors) or multiple different processors (e.g., an Intel Core i5 processor and an Intel Core i7 processor).

Video data storage 206 can be any suitable digital storage mechanism in some embodiments. For example, video data storage 206 can include any device for storing electronic data, program instructions, computer software, firmware, register values, etc., such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Video data storage 206 may be used to store media content, media guidance data, executable instructions (e.g., programs, software, scripts, etc.) for providing an interactive media guidance application, and for any other suitable functions, and/or any other suitable data or program code, in accordance with some embodiments. Nonvolatile memory may also be used (e.g., to launch a boot-up routine and other instructions), in some embodiments.

Each of storage device 110, decoding circuitry 202, encoding circuitry 204, and video-data storage 206 can be provided as a stand-alone device or integrated with other components of architecture 200.

In some embodiments, storage device 110 can be connected to decoding circuitry 202 and encoding circuitry 204 through path paths 208 and 210, respectively. In some embodiments, decoding circuitry 202 can be connected to encoding circuitry 204 through communications path 212. In some embodiments, encoding circuitry 204 can be connected to video-data storage 206 through communications path 214.

Communications paths 208, 210, 212, and 214 may separately or together include one or more communications paths, such as, a satellite path, a fiber-optic path, a cable path, a path that supports internet communications (e.g., IPTV), free-space connections (e.g., for broadcast or other wireless signals), or any other suitable wired or wireless communications path or combination of such paths, in some embodiments In some embodiments, transcoder 112 can also include a demultiplexer circuitry (not shown in FIG. 2). The demultiplexer circuitry can be any suitable circuitry that is capable of demultiplexing a media content transport stream (TS). For example, the demultiplexer circuitry can receive a TS from storage 110 and demultiplex the TS into a video stream, an audio stream, program and system information protocol data stream, etc. The demultiplexer circuitry can also pass the video stream to decoding circuitry 202.

Figure 3:
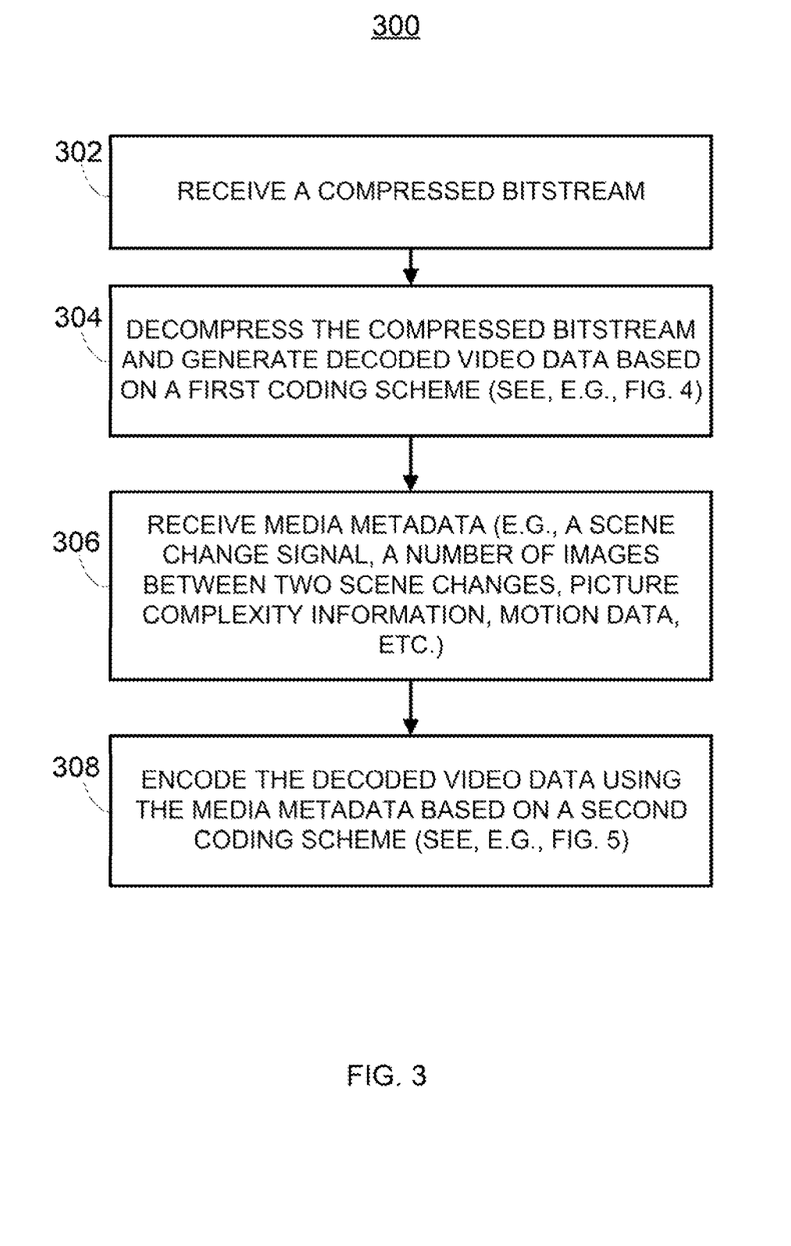
FIG. 3 shows a flow chart of an example of a process for transcoding video data in accordance with some embodiments of the invention.

Turning to FIG. 3, a flow chart of an example 300 of a process for transcoding video data in accordance with some embodiments of the disclosure is shown. In some embodiments, process 300 can be implemented by transcoder 112 as illustrated in FIGS. 1 and 2.

As illustrated, process 300 can start by receiving a compressed bitstream at 302. The compressed bitstream can include any suitable data and can be received in any suitable manner. For example, the compressed bitstream can include video data generated based on any suitable coding standard, such as Motion JPEG, JPEG, MPEG-2, MPEG-4, H.263, H.264, HEVC, etc. More particularly, for example, the video data can include encoded images, decoding parameters, header information, etc. In some embodiments, each of the encoded images can include one or more quantized transform coefficients.

In some embodiments, for example, the compressed bitstream can be received from storage 110 as illustrated in FIGS. 1 and 2. Alternatively or additionally, the compressed bitstream can be received from media encoder 104 and/or media content source 102.

Next, at 304, transcoder 112 can decompress the compressed bitstream and generate decoded video data. The compressed bitstream can be decompressed and the decoded video data can be generated in any suitable manner. For example, transcoder 112 can decompress the compressed bitstream and generate multiple decoded images based on a suitable coding standard, such as Motion JPEG, JPEG 2000, MPEG-2, MPEG-4, H.263, H.264, HEVC, etc. In some embodiments, the decoded images can have any suitable color format, such as RGB, YCrCb, YUV, etc.

Figure 4:
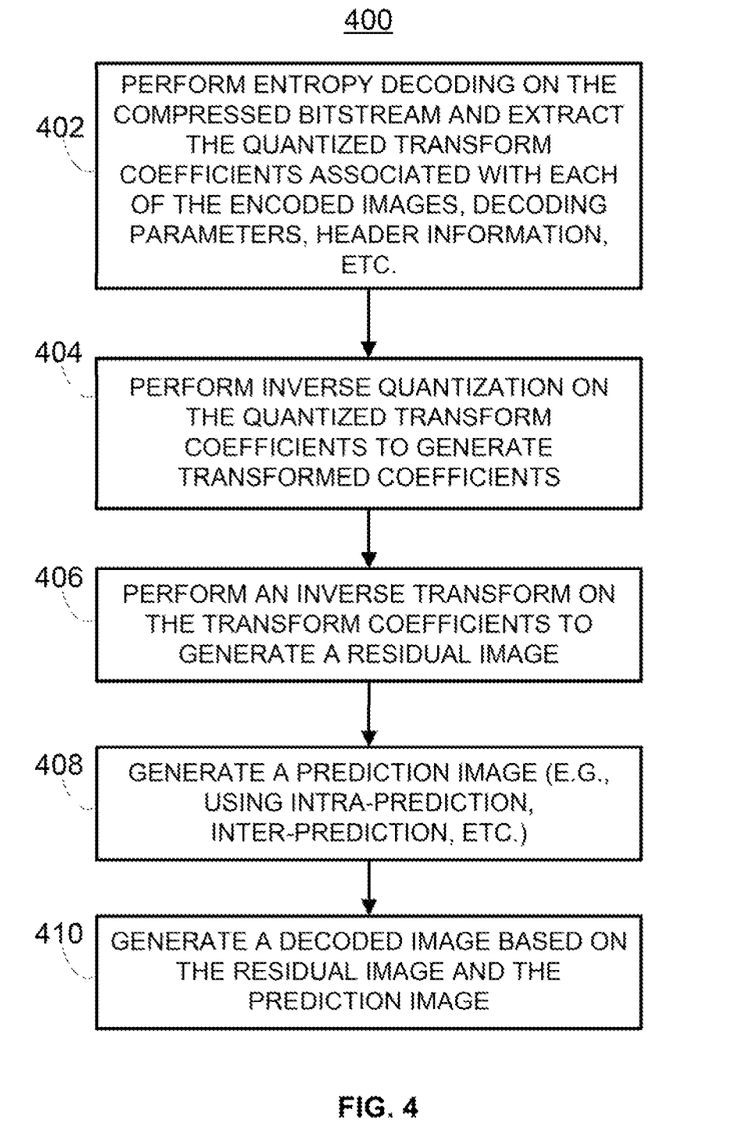
FIG. 4 shows a flow chart of an example of a process for decoding video data in accordance with some embodiments of the invention.

More particularly, for example, each of the decoded images can be generated using a process 400 as illustrated in FIG. 4. In some embodiments, for example, process 400 can be implemented by decoding circuitry 202 of transcoder 112 (FIG. 2).

As shown, at 402, decoding circuitry 202 can perform entropy decoding on the compressed bitstream and extract the quantized transform coefficients associated with each of the encoded images, decoding parameters (e.g., quantization parameters, coding modes, macroblock partition information, motion vectors, reference lists, etc.), header information, etc.

At 404, decoding circuitry 202 can perform inverse quantization on the quantized transformed coefficients associated with a current encoded image to generate one or more transform coefficients. The inverse quantization can be performed in any suitable manner. For example, decoding circuitry 202 can multiply each of the quantized transform coefficients by a suitable quantization parameter. In some embodiments, for example, decoding circuitry 202 can obtain the quantization parameter from the decoding parameters.

At 406, decoding circuitry 202 can perform an inverse transform on the transform coefficients to generate a decoded residual image for the current encoded image. The inverse transform can be performed in any suitable manner. For example, the inverse transform can be an inverse Discrete Cosine Transform (IDCT).

Next, at 408, decoding circuitry 202 can generate a prediction image for the current encoded image. The prediction image can be calculated in any suitable manner. For example, decoding circuitry 202 can generate the prediction image based on a suitable inter-prediction method by referring to one or more previously decoded frames. More particularly, for example, decoding circuitry 202 can perform motion compensation on one or more previously decoded frames and produce a motion compensated reference image as the prediction image. In a more particular example, decoding circuitry 202 can locate a previously decoded image or a portion of the previously decoded image as a reference image for the current encoded image using a motion vector. The reference image can then be used as the motion compensated prediction for the current image. In another more particular example, decoding circuitry 202 can locate two reference images for the current encoded image using one or more motion vectors. Decoding circuitry 202 can then calculate a prediction image for the current encoded image based on the reference images. More particularly, for example, the prediction image can be a weighted prediction of the two reference images.

As another example, decoding circuitry 202 can generate the prediction image based on a suitable intra-prediction method by referring to one or more previously decoded pixels in the same frame. More particularly, for example, decoding circuitry 202 can perform spatial extrapolation to produce an intra-prediction image for the current encoded image. In some embodiments, one or more prediction images can be formed by extrapolating previously decoded pixels of the current frame in any suitable direction, such as vertical, horizontal, diagonal down-left, diagonal down-right, vertical-left, horizontal-down, vertical right, horizontal-up, etc.

At 410, decoding circuitry 202 can generate a decoded image for the current encoded image based on the residual image and the prediction image. The decoded image can be generated in any suitable manner. For example, decoding circuitry 202 can add the prediction image to the decoded residual image to produce the decoded image.

Turning back to FIG. 3, at 306, transcoder 112 can receive media metadata. The media metadata can include any suitable data and can be received in any suitable manner. For example, the media metadata can be the metadata produced by media metadata source 106, as described above in connection with FIG. 1. More particularly, for example, the media metadata can include information about video scenes (e.g., scene change information, the number of the frames between scene changes, the type of a scene change, the number of B-frames between two P-frames, picture complexity information, etc.), motion data about the media content (e.g., motion vector maps, reference lists, etc.), intra-prediction data (e.g., a set of candidate intra-prediction modes, the coding cost and/or distortion corresponding to each candidate intra-prediction mode, etc.), etc.

In some embodiments, for example, encoding circuitry 204 (FIG. 2) can receive the media metadata from storage 110. In some embodiments, encoding circuitry 204 can receive the media metadata from media metadata source 106 through communications network 108 as illustrated in FIG. 1.

At 308, transcoder 112 can encode the decoded video data using the media metadata based on a second coding scheme. The decoded video data can be encoded in any suitable manner. For example, transcoder 112 can encode the decoded images into a set of encoded images based on any suitable coding standard, such as MPEG-2, MPEG-4, H.263, H.264, HEVC, etc. As another example, transcoder 112 can encode the decoded video data into a compressed bitstream including a set of encoded images that has a given bitrate. As yet another example, encoding circuitry 204 can encode the decoded images into a set of encoded images that has a given resolution, such as a spatial resolution, a temporal resolution, a quality resolution, etc.

Figure 5:
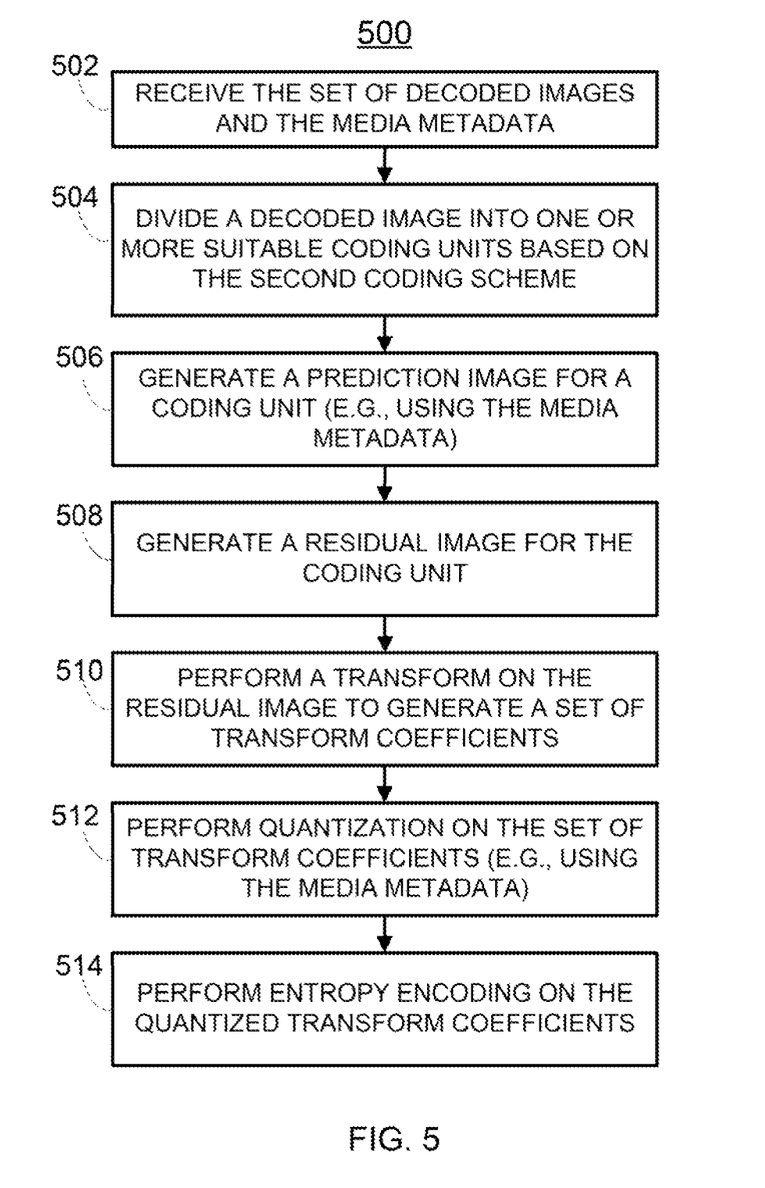
FIG. 5 shows a flow chart of an example of a process for encoding video data in accordance with some embodiments of the invention.

More particularly, for example, transcoder 112 can generate each of the encoded images using a process 500 as illustrated in FIG. 5. In some embodiments, process 500 can be implemented by encoding circuitry 204 of transcoder 112.

At 502, encoding circuitry 204 can receive the set of decoded images and the media metadata. The set of decoded images and the media metadata can be received in any suitable manner. For example, encoding circuitry 204 can receive the set of decoded images from the decoding circuitry 202 and receive the media metadata from storage device 110.

At 504, encoding circuitry 204 can divide a decoded image into one or more suitable coding units based on the second coding scheme. Each of the coding units can have any suitable size and shape and can be obtained in any suitable manner. In some embodiments, for example, the second coding scheme can include the HEVC coding standard. Encoding circuitry 204 can divide a video frame into multiple coding tree units (CTU), each of which can have a size of 8×8, 16×16, 32×32, 64×64, etc. In some embodiments, each of the CTUs can be partitioned into multiple coding tree blocks (CTBs), each of which can have a size of 4×4, 8×8, 16×16, etc. based on the size of the CTU. In some embodiments, each of the CTBs can be further partitioned into multiple coding blocks (CBs) and coding units (CUs).

At 506, encoding circuitry 204 can generate a prediction image for a coding unit. The prediction image can be generated in any suitable way. For example, encoding circuitry 204 can generate the prediction image based on the media metadata such as scene change information, motion data, picture complexity information, intra-prediction information, etc.

In some embodiments, for example, encoding circuitry 204 can generate the prediction image based on a suitable inter-prediction method by referring to one or more reference images. More particularly, for example, encoding circuitry 204 can calculate one or more suitable motion vectors for the coding unit based on the motion vector map corresponding to the coding unit. Encoding circuitry 204 can then generate a motion compensated prediction image for the coding unit based on the motion vectors by referring to one or more reference images. In some embodiments, the motion compensated prediction image can be generated based on one reference frame that can be located using the reference frame lists. For example, encoding circuitry 204 can locate a region in the reference frame as a reference image for the coding unit based on a motion vector. The reference image can then be used as a prediction image for the coding unit. In some embodiments, the motion compensated prediction image can be generated based on two reference frames that can be located using the reference frame lists. For example, encoding circuitry 204 can generate two reference images by locating a region in each of the two reference frames, respectively, based on one or more motion vectors. Encoding circuitry 204 can then produce a prediction for the coding unit using the two reference images. More particularly, for example, the prediction for the coding unit can be a weighted prediction of the two reference images.

In some embodiments, encoding circuitry 204 can generate the predicted image based on a suitable intra-prediction method. The intra-prediction can be performed in any suitable manner. For example, encoding circuitry 204 can generate an intra-prediction image for the coding unit based on the media metadata, such as the intra-prediction data including the set of candidate intra-prediction modes, the coding cost and/or distortion corresponding to each intra-prediction mode, etc. More particularly, for example, encoding circuitry 204 can determine a sub-set of the candidate intra-prediction modes that can be used in accordance with the second coding scheme. Additionally, encoding circuitry 204 can select an intra-prediction mode from the sub-set of candidate intra-prediction modes based on the coding costs and/or distortion corresponding to each of the sub-set of candidate intra-prediction modes. Encoding circuitry 204 can then generate a prediction image for the coding unit based on the selected intra-prediction mode. More particularly, for example, encoding circuitry 204 can predict each pixel of the coding unit by extrapolating pixel samples in a direction defined by the intra-prediction mode.

At 508, encoding circuitry 204 can generate a residual image for the coding unit. The residual image can be generated in any suitable manner. For example, the residual image can be generated at 506 by subtracting the prediction image generated at from the original image of the coding unit.

At 510, encoding circuitry 204 can perform a transform on the residual image and generate a set of transform coefficients. The set of transform coefficients can be generated in any suitable manner. For example, encoding circuitry 204 can perform a Discrete Cosine Transform (DCT) on the residual image and generate a set of DCT coefficients.

At 512, encoding circuitry 204 can perform quantization on the set of transform coefficients. The quantization can be performed in any suitable manner. For example, encoding circuitry 204 can determine a suitable quantization parameter (QP) for a coding unit based on a target bitrate of the second coding scheme. Encoding circuitry 204 can then quantize the transform coefficients using the QP. The target bitrate can be any suitable bitrate, such as a constant bitrate, a variable bitrate, etc. A QP can be determined in any suitable manner. In some embodiments, for example, encoding circuitry 204 can reduce the bitrate of a compressed bitstream by increasing QP or increase the bitrate of a compressed bitstream by decreasing QP. In some embodiments, for example, an I-frame can be encoded using most bits, followed by a P-frame and a B-frame.

In some embodiments, encoding circuitry 204 can determine a QP based on the media metadata (e.g., scene change information, the number of frames between two scenes, the type of each scene change, picture complexity information, etc.), the target bitrate in accordance with the second coding scheme, etc.

For example, encoding circuitry 204 can determine a QP for a group of pictures (GOP) based on the media metadata. The QP can be determined for the GOP in any suitable manner. More particularly, for example, encoding circuitry 204 can determine the structure of a GOP (e.g., the length of the GOP, the distance between P-frames, the distance between I-frames, etc.) based on the media metadata and determine the QP for the GOP based on the structure of the GOP.

In some embodiments, encoding circuitry 204 can calculate the number of bits available to encode the GOP based on the structure of a GOP, the frame rate of the video data, the target rate, etc. Encoding circuitry 204 can then calculate a QP for the GOP based on the number of bits available to encode the GOP. More particularly, for example, the QP can be calculated based on a suitable model that can define the relation between the QP and the target rate, such as a rate-distortion model, a rate-distortion optimization model, etc.

In some embodiments, encoding circuitry 204 can determine the structure of GOP based on the media metadata, such as scene information, the number of frames between two scene changes, the number of B-frames between two P-frames, etc.

In a more particular example, the first frame of the GOP can be an I-frame that can be located using the scene change information. More particularly, for example, the first frame of the GOP can correspond to the start of a video scene.

In another more particular example, the length of the GOP, i.e., the number of frames in the GOP, can be determined based on the number of frames between two scene changes. In some embodiments, the length of the GOP can be equal to the number of frames between two adjacent scene changes. In some embodiments, the length of the GOP can be equal to the number of frames between two given scene changes, e.g., two shot changes, etc.

In yet another more particular example, the distance between P-frames in the GOP can be determined based on the number of B-frames between two P-frames included in the media metadata. In a more particular example, the GOP can include a set of frames IBBPBBP . . . where the distance between P-frames is three.

As another example, encoding circuitry 204 can determine a QP for the coding unit based on the media metadata. More particularly, for example, encoding circuitry 204 can determine the complexity of the coding unit using the picture complexity information (e.g., the maps of spatial complexity, the maps of motion complexity, etc.). Encoding circuitry 204 can then calculate a target number of bits that are available to encode the coding unit based on the complexity of the coding unit. In some embodiments, for example, more bits can be allocated to a coding unit having relatively high complexity while fewer bits can be allocated to a coding unit having relatively lower complexity.

Additionally, encoding circuitry 204 can determine a QP for the coding unit to produce the target number of bits. More particularly, for example, the QP can be calculated based on a suitable model that can define the relation between the QP and the target rate, such as a rate-distortion model, a rate-distortion optimization model, etc.

Next, at 514, encoding circuitry 204 can perform entropy encoding on the quantized transform coefficients. The entropy encoding can be performed in any suitable manner. For example, encoding circuitry 204 can perform the entropy encoding using a suitable variable length encoding method.

It should be noted that the above steps of the flow diagrams of FIGS. 3-5 may be executed or performed in any order or sequence not limited to the order and sequence shown and described in the figures. Furthermore, it should be noted, some of the above steps of the flow diagrams of FIGS. 3-5 may be executed or performed substantially simultaneously where appropriate or in parallel to reduce latency and processing times. And still furthermore, it should be noted, some of the above steps of the flow diagrams of FIGS. 3-5 may be omitted.

In some embodiments, any suitable computer readable media can be used for storing instructions for performing the mechanisms and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The above described embodiments of the present disclosure are presented for purposes of illustration and not of limitation, and the present disclosure is limited only by the claims which follow.

What is claimed is:

1. A method for transcoding video data using a transcoding device, the method comprising:
  receiving a portion of encoded video that includes a first plurality of encoded images encoded according to a first encoding scheme from a media content source using a transcoding device;
  decoding the portion of encoded video based on the first encoding scheme to generate a decoded portion of video including a plurality of decoded images using the transcoding device;
  receiving media metadata at the transcoding device over a communications network from a remote media metadata source, the media metadata being generated and stored on the remote media metadata source prior to decoding the portion of encoded video, wherein the media metadata comprises:
    a set of transcoding parameters that define a second encoding scheme, wherein the first encoding scheme and the second encoding scheme have different bit rates; and
    at least two types of data from the group consisting of motion data, picture complexity information, a number of frames between two scene changes, a set of motion vectors, and a set of intra-prediction modes for use in encoding the decoded portion of video according to a second encoding scheme using the transcoding device; and
  encoding the plurality of decoded images of the decoded portion of video into a second plurality of encoded images based on the second encoding scheme defined by the received media metadata using the transcoding device by performing at least the following operations for each particular decoded image in the plurality of decoded images:
    generating a prediction image for each of a plurality of coding units of the particular decoded image using at least one of the motion data, the set of motion vectors, or a set of intra-prediction modes within the received media metadata according to the second encoding scheme;
    performing transforms on residual images of the plurality of coding units to generate sets of transform coefficients based on the second encoding scheme;
    performing quantization on the sets of transform coefficients by:
      determining a number of bits to encode a group of pictures (GOP) based at least in part on at least one of the picture complexity information or the number of frames between two scene changes;
      determining a quantization parameter based on the number of bits; and
      quantizing the generated set of transform coefficients according to the second encoding scheme using the quantization parameter; and
    performing entropy encoding on the sets of quantized transform coefficients to generate images for the second plurality of encoded images.

2. The method of claim 1, wherein the media metadata source is not an encoder, and wherein the set of transcoding parameters within the received metadata include at least one of a number of B-frames between two P-frames, and a scene change detection signal.

3. The method of claim 2, further comprising determining the number of bits based at least in part on the number of B-frames between two P-frames.

4. The method of claim 3, further comprising determining the number of bits based at least in part on the scene detection signal indicated by the received media metadata.

5. The method of claim 1, wherein the first encoding scheme and the second encoding scheme have different resolutions.

6. The method of claim 1 further comprising dividing each particular decoded image in the plurality of decoded images into a plurality of coding units based on the second encoding scheme.

7. A system for transcoding video data, the system comprising:
  a non-transitory memory storing a transcoding application;
  a processing circuitry; and
  wherein the transcoding application directs the processing circuitry to:
    receive a portion of encoded video that includes a first plurality of encoded images encoded according to a first encoding scheme from a media content source;
    decode the portion of encoded video based on the first encoding scheme to generate a decoded portion of video including a plurality of decoded images;
    receive media metadata over a communications network from a remote media metadata source, the media metadata being generated and stored on the remote media metadata source prior to decoding the portion of encoded video, wherein the media metadata comprises:
      a set of transcoding parameters that define a second encoding scheme, wherein the first encoding scheme and the second encoding scheme have different bit rates; and
      at least two types of data from the group consisting of motion data, picture complexity information, a number of frames between two scene changes, a set of motion vectors, and a set of intra-prediction modes for use in encoding the decoded portion of video according to a second encoding scheme; and encode the plurality of decoded images of the decoded portion of video into a second plurality of encoded images based on the second encoding scheme defined by the received media metadata by performing at least the following operations for each particular decoded image in the plurality of decoded images:

generating a prediction image for each of a plurality of coding units of the particular decoded image using at least one of the motion data, the set of motion vectors, or a set of intra-prediction modes within the received media metadata according to the second encoding scheme;

performing transforms on residual images of the plurality of coding units to generate sets of transform coefficients based on the second encoding scheme;

performing quantization on the sets of transform coefficients by:

determining a number of bits to encode a group of pictures (GOP) based at least in part on at least one of the picture complexity information or the number of frames between two scene changes;

determining a quantization parameter based on the number of bits; and quantizing the generated set of transform coefficients according to the second encoding scheme using the quantization parameter; and performing entropy encoding on the sets of quantized transform coefficients to generate images for the second plurality of encoded images.

8. The system of claim 7, wherein the media metadata source is not an encoder, and wherein the set of transcoding parameters within the received metadata include at least one of a number of B-frames between two P-frames, and a scene change detection signal.

9. The system of claim 8, wherein the processing circuitry is further configured to determine the number of bits based at least in part on the number of B-frames between two P-frames.

10. The system of claim 9, wherein the processing circuitry is further configured to determine the number of bits based at least in part on the scene detection signal indicated by the received media metadata.

11. The system of claim 7 further comprising dividing each particular decoded image in the plurality of decoded images into a plurality of coding units based on the second encoding scheme.

12. The system of claim 7, wherein the first encoding scheme and the second encoding scheme correspond to different video encoding standards.

13. A non-transitory computer-readable medium containing computer-executable instructions that, when executed by a processing circuitry, cause the processing circuitry to perform a method for transcoding video data, the method comprising:

receiving a portion of encoded video that includes a first plurality of encoded images encoded according to a first encoding scheme from a media content source;

decoding the portion of encoded video based on the first encoding scheme to generate a decoded portion of video including a plurality of decoded images;

receiving media metadata over a communications network from a remote media metadata source, the media metadata being generated and stored on the remote media metadata source prior to decoding the portion of encoded video, wherein the media metadata comprises:

a set of transcoding parameters that define a second encoding scheme, wherein the first encoding scheme and the second encoding scheme have different bit rates; and at least two types of data from the group consisting of motion data, picture complexity information, a number of frames between two scene changes, a set of motion vectors, and a set of intra-prediction modes for use in encoding the decoded portion of video according to a second encoding scheme; and encoding the plurality of decoded images of the decoded portion of video into a second plurality of encoded images based on the second encoding scheme defined by the received media metadata by performing at least the following operations for each particular decoded image in the plurality of decoded images:

generating a prediction image for each of a plurality of coding units of the particular decoded image using at least one of the motion data, the set of motion vectors, or a set of intra-prediction modes within the received media metadata according to the second encoding scheme;

performing transforms on residual images of the plurality of coding units to generate sets of transform coefficients based on the second encoding scheme;

performing quantization on the sets of transform coefficients by:

determining a number of bits to encode a group of pictures (GOP) based at least in part on at least one of the picture complexity information or the number of frames between two scene changes;

determining a quantization parameter based on the number of bits; and quantizing the generated set of transform coefficients according to the second encoding scheme using the quantization parameter; and performing entropy encoding on the sets of quantized transform coefficients to generate images for the second plurality of encoded images.

14. The non-transitory computer-readable medium of claim 13, wherein the media metadata source is not an encoder, and wherein the set of transcoding parameters within the received metadata include at least one of a number of B-frames between two P-frames, and a scene change detection signal.

15. The non-transitory computer-readable medium of claim 14, wherein the method further comprises determining the number of bits based at least in part on the number of B-frames between two P-frames.

16. The non-transitory computer-readable medium of claim 15, wherein the method further comprises determining the number of bits based at least in part on the scene detection signal indicated by the received media metadata.

17. The non-transitory computer-readable medium of claim 13 further comprising dividing each particular decoded image in the plurality of decoded images into a plurality of coding units based on the second encoding scheme.

18. The non-transitory computer-readable medium of claim 13, wherein the first encoding scheme and the second encoding scheme have different resolutions.

19. The non-transitory computer-readable medium of claim 13, wherein the first encoding scheme and the second encoding scheme correspond to different video coding standards.

* * * * *